(12) United States Patent
Huisman

(10) Patent No.: US 11,052,828 B2
(45) Date of Patent: Jul. 6, 2021

(54) CARGO RACK FOR TRUCKS

(71) Applicant: George Huisman, Milford, MI (US)

(72) Inventor: George Huisman, Milford, MI (US)

( * ) Notice: Subject to any disclaimer, the term of this patent is extended or adjusted under 35 U.S.C. 154(b) by 0 days.

(21) Appl. No.: 17/015,159

(22) Filed: Sep. 9, 2020

(65) Prior Publication Data

US 2021/0086703 A1    Mar. 25, 2021

Related U.S. Application Data

(60) Provisional application No. 62/902,863, filed on Sep. 19, 2019.

(51) Int. Cl.
*B60R 9/06* (2006.01)
*B60P 7/08* (2006.01)

(52) U.S. Cl.
CPC .............. *B60R 9/06* (2013.01); *B60P 7/0815* (2013.01)

(58) Field of Classification Search
CPC .. B60R 9/06; B60R 9/042; B60R 9/00; B60R 9/045; B60R 5/041; B60R 9/058; B60P 7/0815; B60P 3/40; B60P 7/15; B62D 33/0207; Y10S 224/924
See application file for complete search history.

(56) References Cited

U.S. PATENT DOCUMENTS

| | | | |
|---|---|---|---|
| 2,720,414 A * | 10/1955 | Hart | B62D 33/08 296/12 |
| 4,527,827 A * | 7/1985 | Maniscalco | B60R 9/08 108/44 |
| 4,650,383 A * | 3/1987 | Hoff | B60P 7/15 410/149 |
| 4,659,131 A * | 4/1987 | Flournoy, Jr. | B60R 9/00 296/3 |
| 4,681,247 A * | 7/1987 | Prosen | B60R 9/00 224/322 |
| 4,770,458 A * | 9/1988 | Burke | B60R 9/00 224/405 |
| 5,037,152 A * | 8/1991 | Hendricks | B60R 9/00 296/3 |

(Continued)

FOREIGN PATENT DOCUMENTS

KR    200287765 Y1    9/2002

OTHER PUBLICATIONS

Int'l Search Report for PCT/US2020/050828, dated Dec. 8, 2020.

*Primary Examiner* — Brian D Nash
(74) *Attorney, Agent, or Firm* — Blue Filament Law PLLC

(57) ABSTRACT

A rack for a truck includes a rail system having a first rail and a second rail each having a first end and a second end. The second rail is configured to be spaced apart from and positioned parallel to the first rail. A first support structure and a second support structure each have a first end and a second end and a cross member having a first end and a second end configured to laterally extend between said first rail and said second rail. The first support structure and the second support structure are configured to engage with said rail system. At least the first support structure is configured to be slidably positioned within the rail system such that the first support structure abuts the second support structure in a closed or unloaded configuration and is separated from the second support structure in an open or loaded configuration.

19 Claims, 8 Drawing Sheets

(56) References Cited

U.S. PATENT DOCUMENTS

| | | | | |
|---|---|---|---|---|
| 5,143,415 | A * | 9/1992 | Boudah | B60R 9/00 224/325 |
| 5,303,858 | A * | 4/1994 | Price | B60P 3/073 224/282 |
| 5,431,472 | A * | 7/1995 | Coffland | B60R 9/00 224/403 |
| 5,494,327 | A | 2/1996 | Derecktor | |
| D394,639 | S * | 5/1998 | Carter | D12/406 |
| 5,746,301 | A * | 5/1998 | Maier | B65G 47/962 198/370.04 |
| D398,284 | S * | 9/1998 | Carter | D12/406 |
| 6,283,525 | B1 * | 9/2001 | Morse | B62D 33/0273 280/748 |
| 6,520,723 | B2 * | 2/2003 | Christensen | B60P 3/40 410/100 |
| 6,598,922 | B2 * | 7/2003 | Morse | B60P 3/40 296/26.02 |
| 7,497,493 | B1 * | 3/2009 | Thiessen | B60P 7/15 296/3 |
| 7,874,774 | B2 * | 1/2011 | Peterson | B60P 7/0815 410/104 |
| 7,878,743 | B2 * | 2/2011 | Aftanas | B60P 7/0815 410/150 |
| 8,328,263 | B1 * | 12/2012 | Alexander | B60R 5/041 296/26.09 |
| 8,668,125 | B2 * | 3/2014 | Williams | B60R 9/06 224/405 |
| 8,864,001 | B2 * | 10/2014 | Langseder | B60R 5/041 224/405 |
| 9,333,893 | B2 * | 5/2016 | Simmons | B60R 5/041 |
| 9,566,914 | B2 * | 2/2017 | Marr, Jr. | B62D 33/0207 |
| 9,623,787 | B2 * | 4/2017 | Sterling | B60P 7/0815 |
| 9,796,428 | B1 * | 10/2017 | Tamaddon-Dallal | B60R 9/042 |
| D810,654 | S * | 2/2018 | Dionisopoulos | D12/406 |
| 9,937,848 | B1 * | 4/2018 | Grabowski | B60P 7/15 |
| 10,131,286 | B2 * | 11/2018 | Jimenez Hernandez | B60R 9/045 |
| 10,800,340 | B1 * | 10/2020 | Mayville | B60P 7/15 |
| 10,850,676 | B1 * | 12/2020 | Worker | B62D 33/0273 |
| 2002/0167186 | A1 * | 11/2002 | Morse | B60R 9/00 296/26.02 |
| 2003/0080167 | A1 * | 5/2003 | Kmita | B60R 9/00 224/321 |
| 2003/0184110 | A1 * | 10/2003 | Voves | B60R 9/00 296/37.6 |
| 2008/0121671 | A1 * | 5/2008 | Cronce | B60R 9/058 224/331 |
| 2008/0143133 | A1 * | 6/2008 | Nichols | B60P 7/0815 296/3 |
| 2010/0194137 | A1 | 8/2010 | Kealy | |
| 2011/0250042 | A1 | 10/2011 | Juarez-Ortega | |
| 2013/0306694 | A1 * | 11/2013 | Langseder | B60R 9/045 224/403 |
| 2015/0183363 | A1 * | 7/2015 | Puchkoff | B60R 9/06 410/110 |
| 2016/0059906 | A1 * | 3/2016 | Leitner | B60R 9/06 296/3 |
| 2016/0090048 | A1 * | 3/2016 | Crandall | B60R 9/06 224/403 |
| 2016/0159290 | A1 * | 6/2016 | Tamaddon-Dallal | B60R 9/045 224/402 |
| 2017/0066384 | A1 | 3/2017 | Finestone | |
| 2017/0166105 | A1 * | 6/2017 | Puchkoff | B60P 7/0815 |
| 2017/0166264 | A1 * | 6/2017 | Puchkoff | B60R 9/06 |
| 2018/0050644 | A1 * | 2/2018 | Singer | B60P 3/42 |
| 2018/0111542 | A1 * | 4/2018 | Mueller | B60R 9/10 |
| 2018/0111562 | A1 * | 4/2018 | Crandall | B60P 7/0815 |
| 2018/0154817 | A1 * | 6/2018 | Chambers | B62D 33/023 |
| 2019/0367101 | A1 * | 12/2019 | McFadden | B60R 9/06 |
| 2020/0031289 | A1 * | 1/2020 | Williams | B60R 9/045 |
| 2020/0148281 | A1 * | 5/2020 | Elder | B60P 7/0807 |

\* cited by examiner

CARGO RACK FOR TRUCKS

RELATED APPLICATIONS

This application is a non-provisional application that claims priority benefit of U.S. Provisional Application Ser. No. 62/902,863 filed 19 Sep. 2019; the contents of which are hereby incorporated by reference.

FIELD OF THE INVENTION

The present invention in general relates to a cargo securing system for a pickup truck and in particular to a cargo rack for use with a pickup truck for securely carrying long items and that is configured for loading by a single user.

BACKGROUND OF THE INVENTION

Pickup truck racks are typically used for carrying cargo and large equipment in the back of a pickup truck. Typically, the items carried by such truck racks are long, cumbersome items that do not fit within the confines of the bed of the pickup truck, such as canoes, kayaks, lumber, ladders, etc.

Typical truck racks are intended to be mounted to a truck cargo area either within the truck bed, along the walls of the truck bed, or a combination thereof. Such racks are typically intended to be removed from the vehicle when not in use for carrying cargo so as to not interfere with the aerodynamics of the vehicle nor the field of vision of the driver. As these devices are bulky and cumbersome themselves, removal after each use and installation prior to each use requires substantial labor, often from at least two people. Such installation and removal also typically require standard or specialized tools that must be kept with the rack or located before installation and removal. Such typical truck racks also require being stored in a secure and clean location when not mounted on a vehicle, usually taking up valuable garage or shed space.

While truck racks that remain permanently mounted to a vehicle have been attempted such as those that include parts that nest within other parts of the rack or that nest within the cargo compartment of a pickup truck, these racks have proven disadvantageous in that they interfere with a driver's field of vision, interfere with the aerodynamics and therefore fuel efficiency of the vehicle, and/or take up valuable space within the cargo compartment of the vehicle.

Another drawback of typical truck racks is that they require two people to assist with loading and unloading the cargo onto and off of the rack owing in part to the spaced apart nature of the support structures of the rack, the overhead position of the support structures of the rack, and the long cumbersome nature of the typical items stored on such racks. Loading of an item onto and off of typical racks can be labor intensive, physically demanding, and potentially dangerous, requiring that the multiple users lift heavy or cumbersome objects above their heads for prolonged periods of time.

Thus, there exists a need for a cargo rack for use with a pickup truck for securely carrying items that is configured to be permanently mounted to the vehicle without interfering with a driver's field of vision, without interfering with the aerodynamics and therefore fuel efficiency of the vehicle, that does not take up space within the cargo compartment of the vehicle, and that is configured for safe and easy loading by a single user.

SUMMARY OF THE INVENTION

The present invention provides a rack for a truck that includes a rail system having a first rail and a second rail and a first support structure and a second support structure. Each rail has a first end and a second end. The rails are configured to be installed around a bed of a truck. The second rail is configured to be spaced apart from and positioned parallel to the first rail. The first support structure and the second support structure each have a first end and a second end and a cross member having a first end and a second end. Each cross member is configured to laterally extend between said first rail and said second rail. The first support structure and the second support structure are configured to engage with said rail system. At least the first support structure is configured to be slidably positioned within the rail system such that the first support structure abuts the second support structure in a closed or unloaded configuration and is separated from the second support structure in an open or loaded configuration.

BRIEF DESCRIPTION OF THE DRAWINGS

The present invention is further detailed with respect to the following drawings that are intended to show certain aspects of the present invention but should not be construed as a limit on the practice of the present invention.

DESCRIPTION OF THE INVENTION

Figure 1:
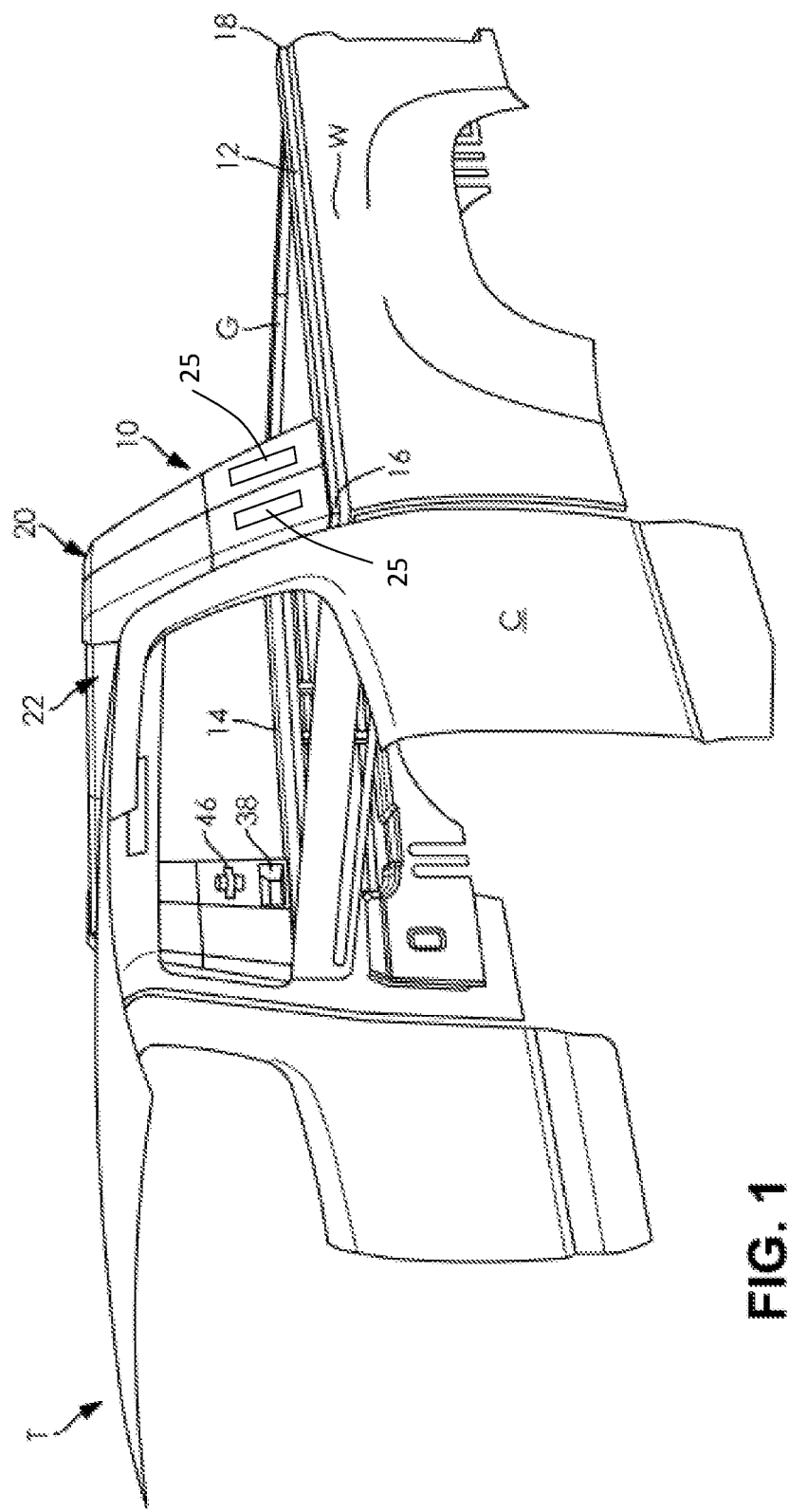
FIG. 1 is a front perspective view of a cargo rack according to embodiments mounted on a pickup truck in a closed or unloaded configuration.

The present invention has utility as a cargo rack for use with a pickup truck for securely carrying long items. The inventive rack is configured to be permanently mounted to the vehicle without interfering with a driver's field of vision and without interfering with the aerodynamics and therefore fuel efficiency of the vehicle. Furthermore, the inventive rack is configured to not take up space within the cargo compartment of the vehicle and is configured for safe and easy loading by a single user.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Referring now to the figures, an inventive rack 10 includes a rail system including a first rail 12 and a second rail 14. According to embodiments, the rails 12, 14 are formed of aluminum or another high strength and light weight material. Each rail 12, 14 has a first end 16, 16' and a second end 18, 18', respectively. The rails 12, 14 are configured to be spaced apart from one another and positioned in parallel. According to embodiments, the rail system is configured to be attached to the bed B of a truck or, as shown in the figures, to walls W that are positioned around the bed B of a truck and that define the cargo space of a truck. As shown in the figures, the first end 16, 16' of each of the rails 12, 14 is positioned near the cab C at the front on the truck, while the second end 18, 18' of each of the rails 12, 14 is positioned near a tailgate or liftgate G at the rear of the truck T.

The rack 10 also includes a first support structure 20 and a second support structure 22. According to embodiments the support structures 20, 22 are formed of aluminum, thermoset material, thermoplastic material, or a combination thereof such that the rack 10 is of a sufficient strength for holding cargo while also being light weight to not degrade the fuel efficiency of the truck. Each support structure 20, 22 has a first end 24, 24' and a second end 26, 26'. Each support structure 20, 22 also includes a cross member 28, 28' having a first end 30, 30' and a second end 32, 32'. The cross members 28, 28' have a generally rectangular cross section. According to embodiments, the cross members 28, 28' are smooth, allowing air to pass over the cross members 28, 28' with minimal turbulence. As shown in the figures, each cross member 28, 28' of each of the first support structure 20 and second support structure 22 is configured to laterally extend between the first rail 12 and the second rail 14, when the ends 24, 24', 26, 26' of the support structures 20, 22 are engaged with the rails 12, 14.

According to embodiments, the support structures 20, 22 each also include a first support member 34, 34' extending from the first end 30, 30' of each cross member 28, 28' to the first end 24, 24' of each support structure 20, 22 and a second support member 36, 36' extending from the second end 32, 32' of each cross member 28, 28' to the second end 26, 26' of each support structure 20, 22. According to embodiments, the support structures 20, 22 with the support members 34, 34', 36, 36' and the cross member 28, 28' are generally C-shaped. The support members 34, 34', 36, 36' each have a generally rectangular cross section. According to embodiments, the support members 34, 34', 36, 36' are smooth, allowing air to pass over the cross members 28, 28' with minimal turbulence. As shown in the figures, the support members 34, 34', 36, 36' elevate the cross members 28, 28' of the support structures 20, 22 above the rails 12, 14. According to embodiments, the support members 34, 34', 36, 36' are long enough to elevate the cross members 28, 28' to approximately the height of the roof of the cab C, such that a driver's view through a rear window of the truck is unobstructed when the rack 10 is installed on the truck T.

Figure 3:
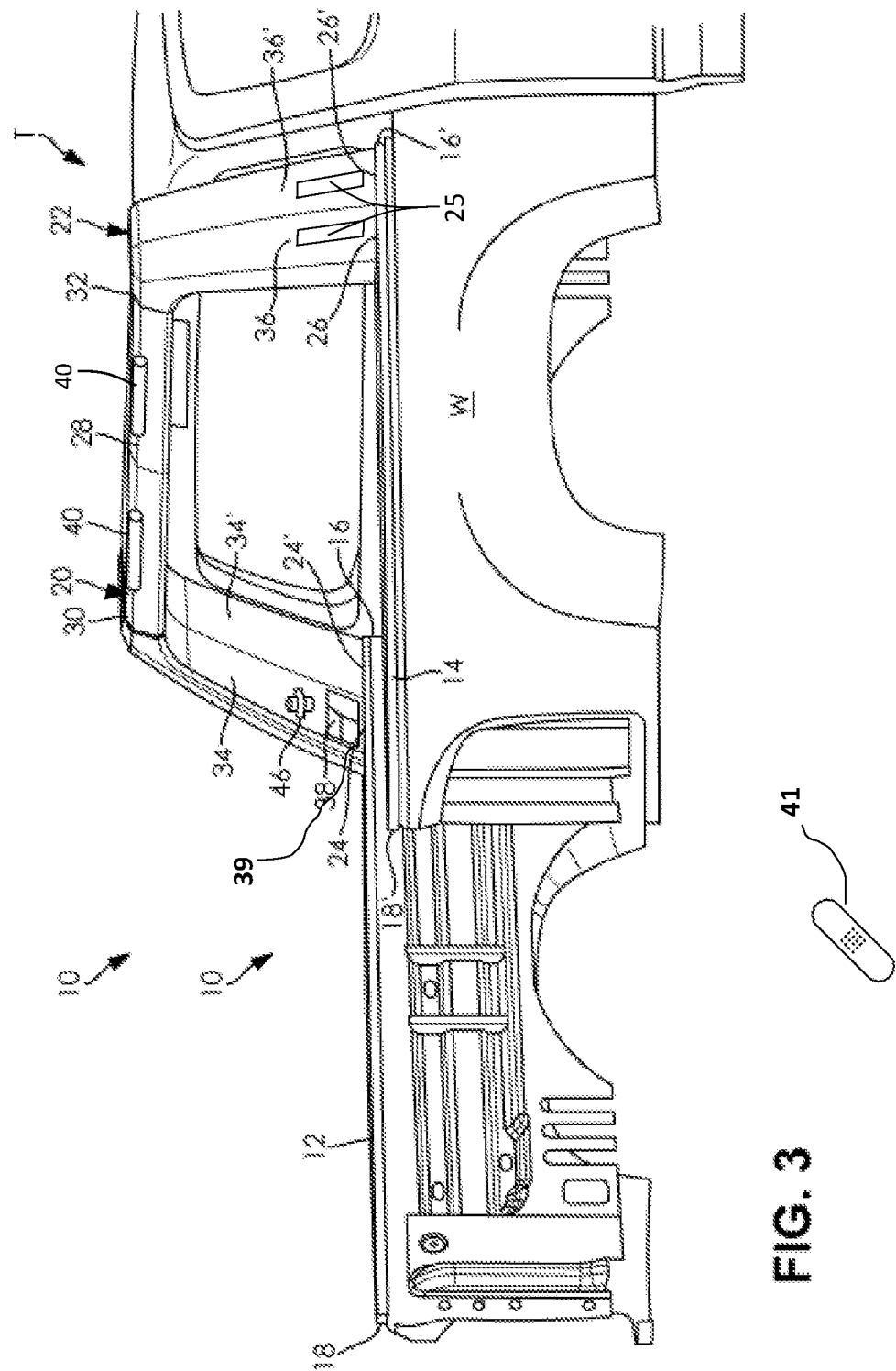
FIG. 3 is a rear perspective view of a cargo rack according to embodiments mounted on a pickup truck in a closed or unloaded configuration.
Figure 4:
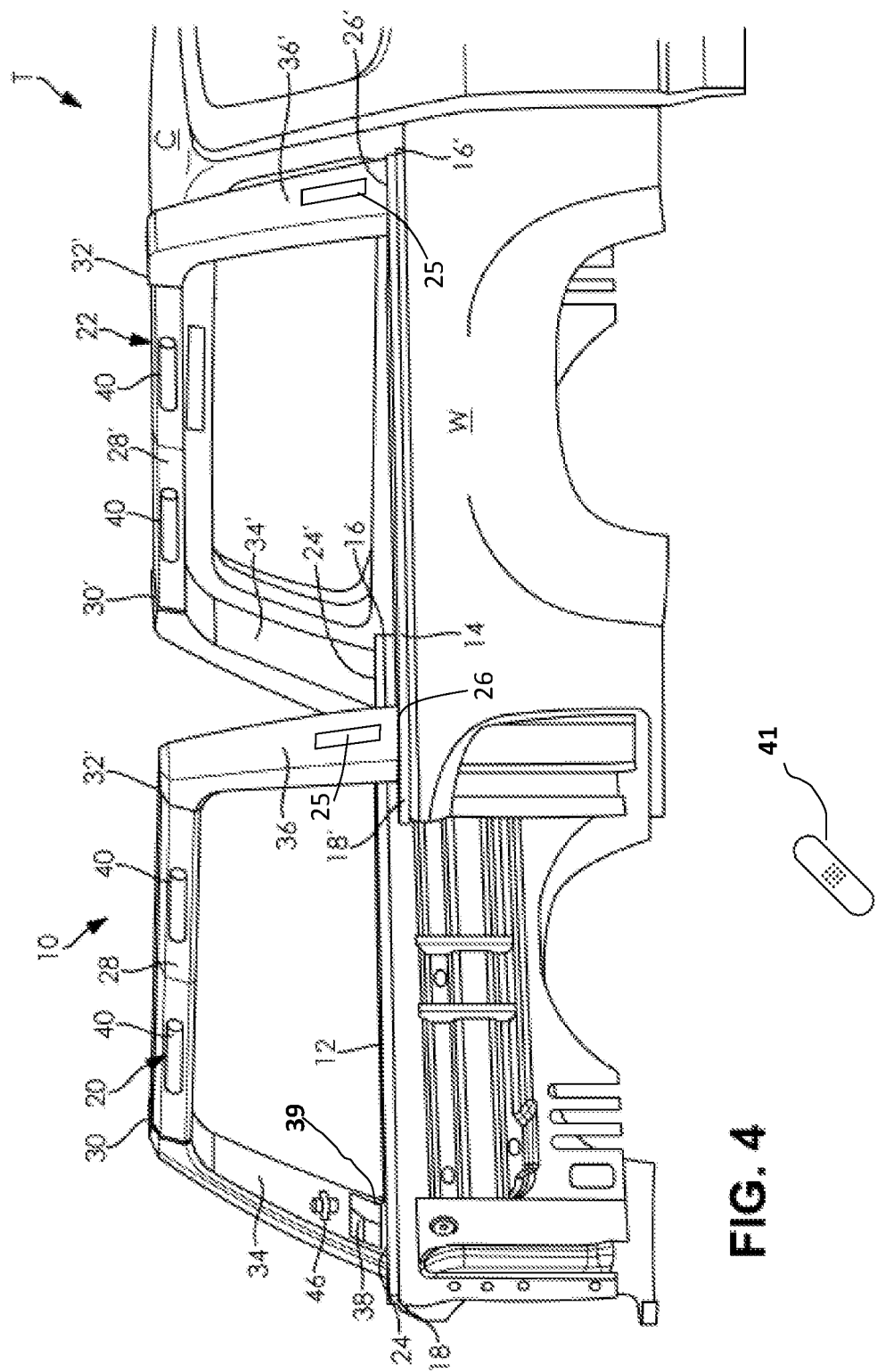
FIG. 4 is a rear perspective view of the cargo rack of FIG. 3 in an open or loaded configuration.
Figure 5:
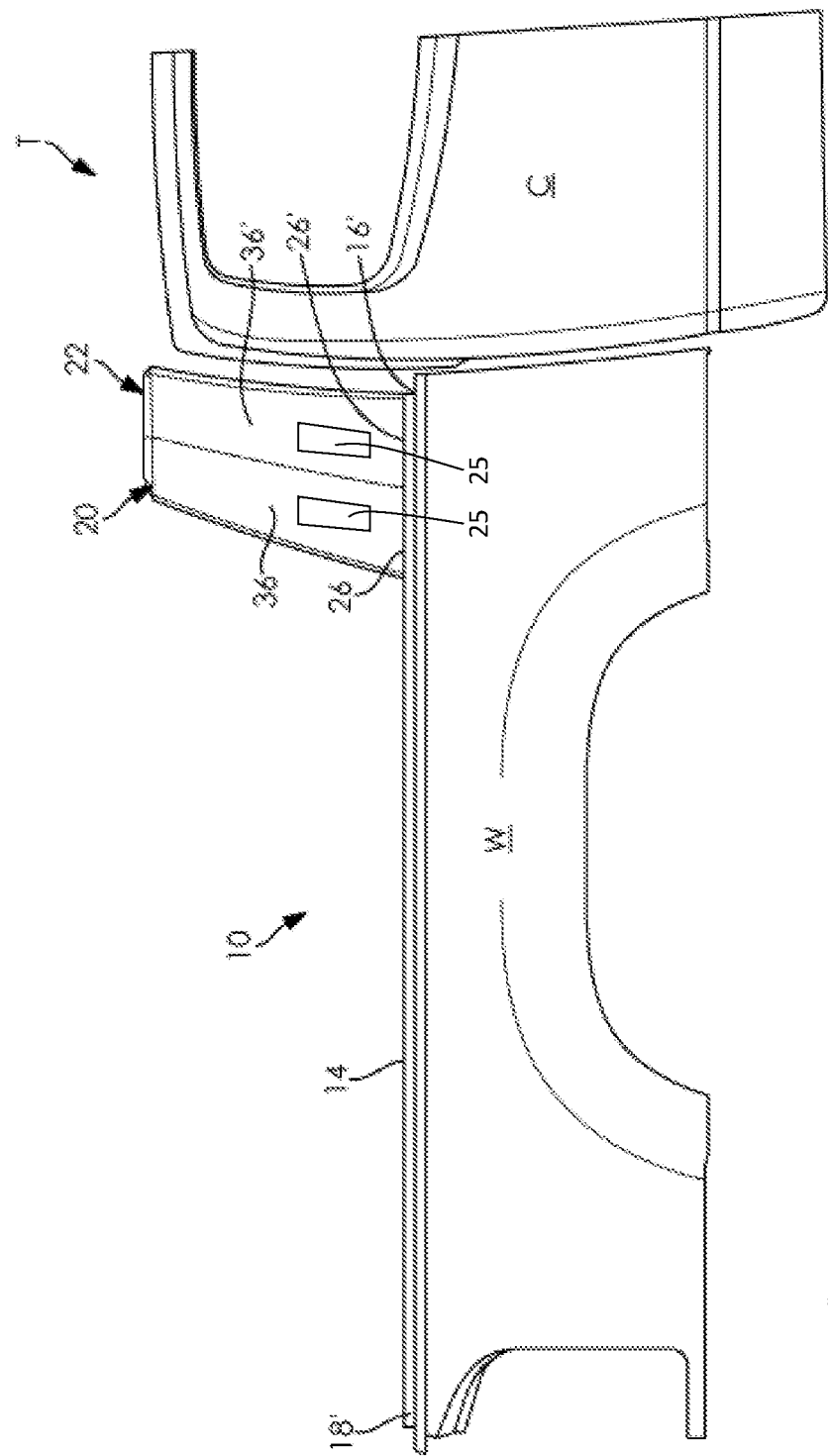
FIG. 5 is a side view of a cargo rack according to embodiments mounted on a pickup truck in a closed or unloaded configuration.
Figure 6:
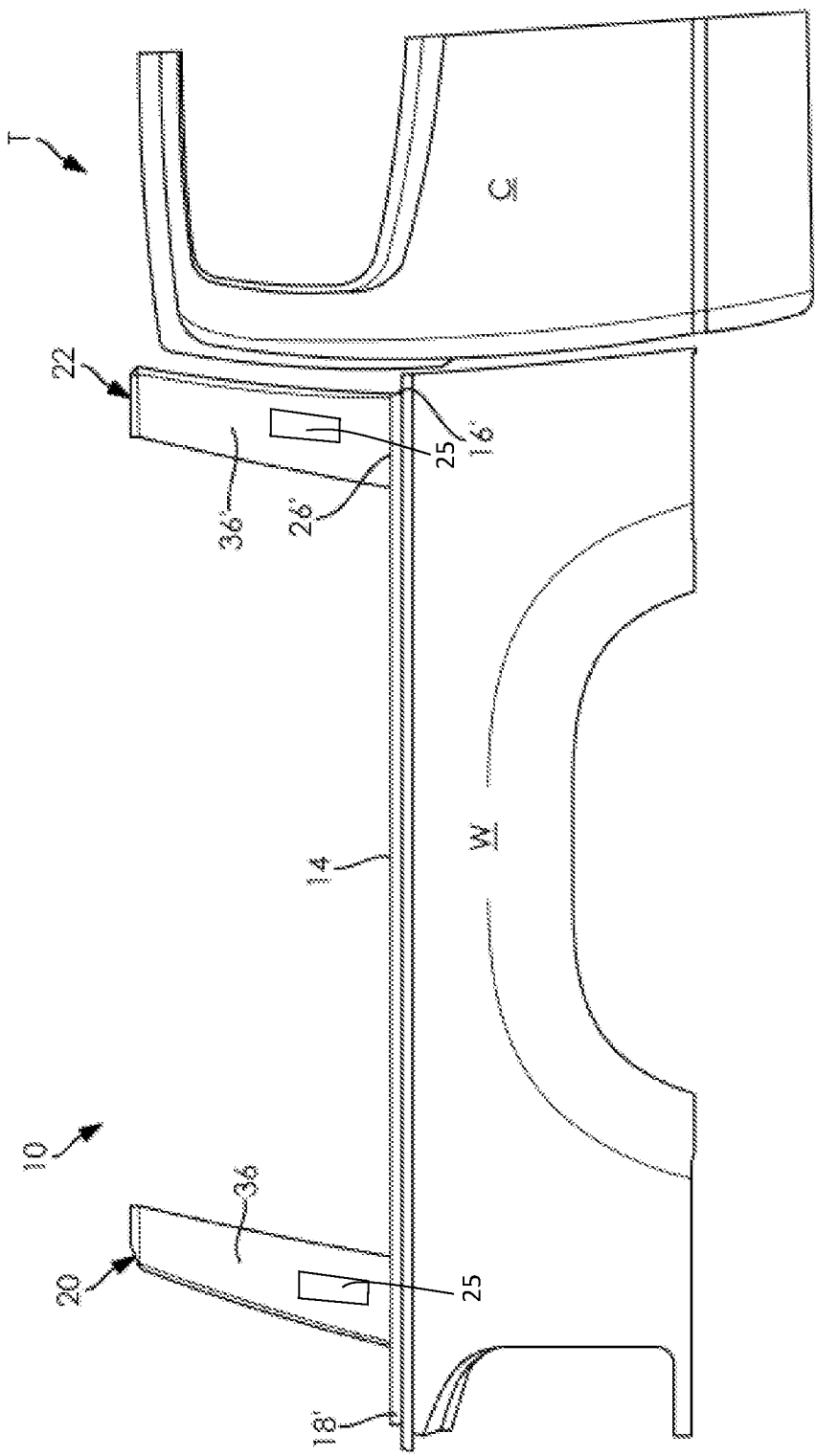
FIG. 6 is a side view of the cargo rack of FIG. 5 in an open or loaded configuration.

According to embodiments, the support members 34, 34', 36, 36' are height adjustable. Therefore, each of the support members 34, 34', 36, 36' may include at least two sections, as shown in FIGS. 1, 2, 7, and 8, that telescope relative to one another. In the Figures, the support members 34, 34', 36, 36' are shown fully extended, however, the two sections of each support member 34, 34', 36, 36' are shown. According to such embodiments, the height of the support members 34, 34', 36, 36' is manually or electronically adjusted. Electronic movement control is exerted by one or more motors. In still other inventive embodiments, the slide motion of the support member 22 is controlled by a one or more motors 39 depicted in FIGS. 3 and 4. The motor 39 being mechanically coupled to rail 12 to selectively move a support structure 20 or 22 along the length the truck bed. In still other inventive embodiments, like motors 39 are placed in opposing support members to drive both in concert along the rails 12 and 14. It has been observed that heavy or uneven loads induce differential rates of sliding that in extreme instances can lead cause slide stopping buckling. In still other inventive. The height of the support members 34, 34', 36, 36' can be adjusted by way of telescoping portions of the support members 34, 34', 36, 36' that lock into position relative to one another, by way of pneumatic cylinders, by an internal ratcheting or gear system, or the like. In still other inventive embodiments, a user remote control 41 is provided for wireless control of at least one of the height of the support members 34, 34', 36, 36'; or the slide position of the support structure 22. As a result, a single user is able to stabilize a load, such as a kayak while the inventive system moves to support the load for transport, all the while the load being controlled from a catastrophic dislodgement.

As shown in the figures, the support structures 20, 22 are installed with the rail system such that the second support structure 22 is at least initially positioned at the first ends 16, 16' of the rails 12, 14 near the cab C of the truck T. The first support structure 20 is positioned behind the second support structure 22 when installed on the rails 12, 14.

The first ends 24, 24' of the support structures 20, 22 are configured to engage with the first rail 12 and the second ends 26, 26' of the support structures 20, 22 are configured to engage with the second rail 14. The ends 24, 24', 26, 26' of the support structures 20, 22 have a shape that corresponds with the shape of the rails 12, 14. According to embodiments, the rails 12, 14 define an internal channel that is for example T-shaped, while the ends 24, 24', 26, 26' of the support structures have a corresponding T shape that fits within the T-shaped channel of the rails 12, 14. According to embodiments, the rails 12, 14 define external grooves, while the ends 24, 24', 26, 26' of the support structures are shaped such that they snap onto the rails 12, 14 with a portion extending and locking into the external grooves of the rails 12, 14. One of ordinary skill in the art will appreciate that the ends 24, 24', 26, 26' of the support structures 20, 22 may engage with the rails 12, 14 in a number of other ways provided that the ends 24, 24', 26, 26' are secured to the rails 12, 14 and the ends 24, 24', 26, 26' slidable along the rails 12, 14.

Furthermore, when the support structures 20, 22 are installed with the rails 12, 14, at least the first support structure 20 is slidable within the rail system. That is, the position of at least the first support structure 20, and according to embodiments both support structures 20, 22, relative to the length of the rail system is slidably positionable within the rail system. Given the slidable nature of at least the first support structure 20 within the rail system, the first support structure 20 is configured to slide along the length of the rails 12, 14 between the second ends 18, 18' of the rails 12, 14 and the first ends 16, 16' of the rails 12, 14 to a position where the first support structure 20 abuts the second support structure 22. Accordingly, the first support structure 20 is positionable along the length of the rails 12, 14 and is therefore capable of being positioned in a closed or unloaded configuration in which the first support structure 20 abuts the second support structure 22, preferably near the first ends 16, 16' of the rails 12, 14 near the cab C, such as that shown in FIGS. 1, 3, 5, and 7, and an open or loaded configuration in which the first support structure 20 is separated from the second support structure 22, such as that shown in FIGS. 2, 4, 6, and 8. According to embodiments the second support structure 22 is also slidable along the rails 12, 14.

According to embodiments, at least the first slidable support structure 20 and optionally the second slidable support structure 22 includes a lock mechanism 25 near its first end 24, 24' and second end 26, 26'. The lock mechanisms 25 are configured to secure the position of the support structure 20, 22 relative to the rails 12, 14 once the support structure 20, 22 has been slid into its desired position along the length of the rails 12, 14. According to embodiments, the locking mechanism 25 is a handled clamp (as shown in FIGS. 1-8), a cotter key or bolt used in conjunction with through holes in the support structures 20, 22 and along the length of the rails 12, 14, a spring button lock on the support structures 20, 22 used in conjunction with through holes along the length of the rails 12, 14, or any other suitable locking mechanism. According to embodiments, the lock mechanisms 25 are configured to be flush with the support members 34, 34', 36, 36' of the support structures 20, 22 when the lock mechanisms 25 are engaged in a locked position securing the position of the support structure 20, 22 relative to the rails 12, 14. The lock mechanisms 25 are further configured to be disengaged, or example by pulling on a handle of the lock mechanism 25 away from the support members 34, 34', 36, 36' of the support structures 20, 22, allowing the support structure 20, 22 to be slid into its desired position along the length of the rails 12, 14. The, the engage the lock mechanisms 25 to secure the position of the support structure 20, 22 relative to the rails 12, 14 in the desired position, the lock mechanisms 25 are each returned to a position that is generally flush with the support members 34, 34', 36, 36'. It will be noted that other positions of the lock mechanisms 25 are contemplated, but a position near the ends of the support members 34, 34', 36, 36' ensure that a user standing on the ground or standing in the truck bed is able to reach and access the lock mechanisms and the position of the lock mechanisms being generally flush with the support members 34, 34', 36, 36' contributes to the aerodynamics of the vehicle.

According to embodiments, the support structures 20, 22 are slidably positioned along the rails 12, 14 by electronic controls, which according to embodiments are controlled by a user remote. According to embodiments, the electronic controls include a number of preset positions for the support structures 20, 22. For example, the electronic controls can direct the support structures 20, 22 into an unloaded present position in which both support structures move to their fully extended heights and move to the first end 16, 16' of the rails 12, 14 near the cab C. The electronic controls can include yet another preset position such as a loaded preset position in which the support structures are controlled into a maximally separated position wherein the first support structure 20 is positioned near the second end 18, 18' of the rails 12, 14 while the second support structure 22 is positioned near the first end 16, 16' of the rails 12, 14. A number of intermediate preset positions may also be included in the electronic controls. For example, a loading preset position may direct the first support structure 20 a lowered height at the second end 18, 18' of the rails 12, 14 and/or the second support structure 22 to a position at the center of the rails 12, 14 to facilitate the loading of cargo onto the rack 10. According to embodiments, the preset positions are pre-programmed into a user remote control. According to embodiments, additional preset positions may be programmed into the remote control by a user based on the user's preferences.

According to embodiments the rack 10 is further equipped with devices that further facilitate easy loading and securing of cargo onto the rack 10 by a single user. As shown in FIGS. 3, 4, 7, and 8, embodiments of the rack 10 are equipped with a roller 40 on each of the cross members 28, 28'. The rollers 40 allow the cargo to be rolled along the support structures 20, 22 once the cargo is on the support structures 20, 22, thereby alleviating the strength required to push and pull the cargo into position on and off the support structures 20, 22.

Figure 7:
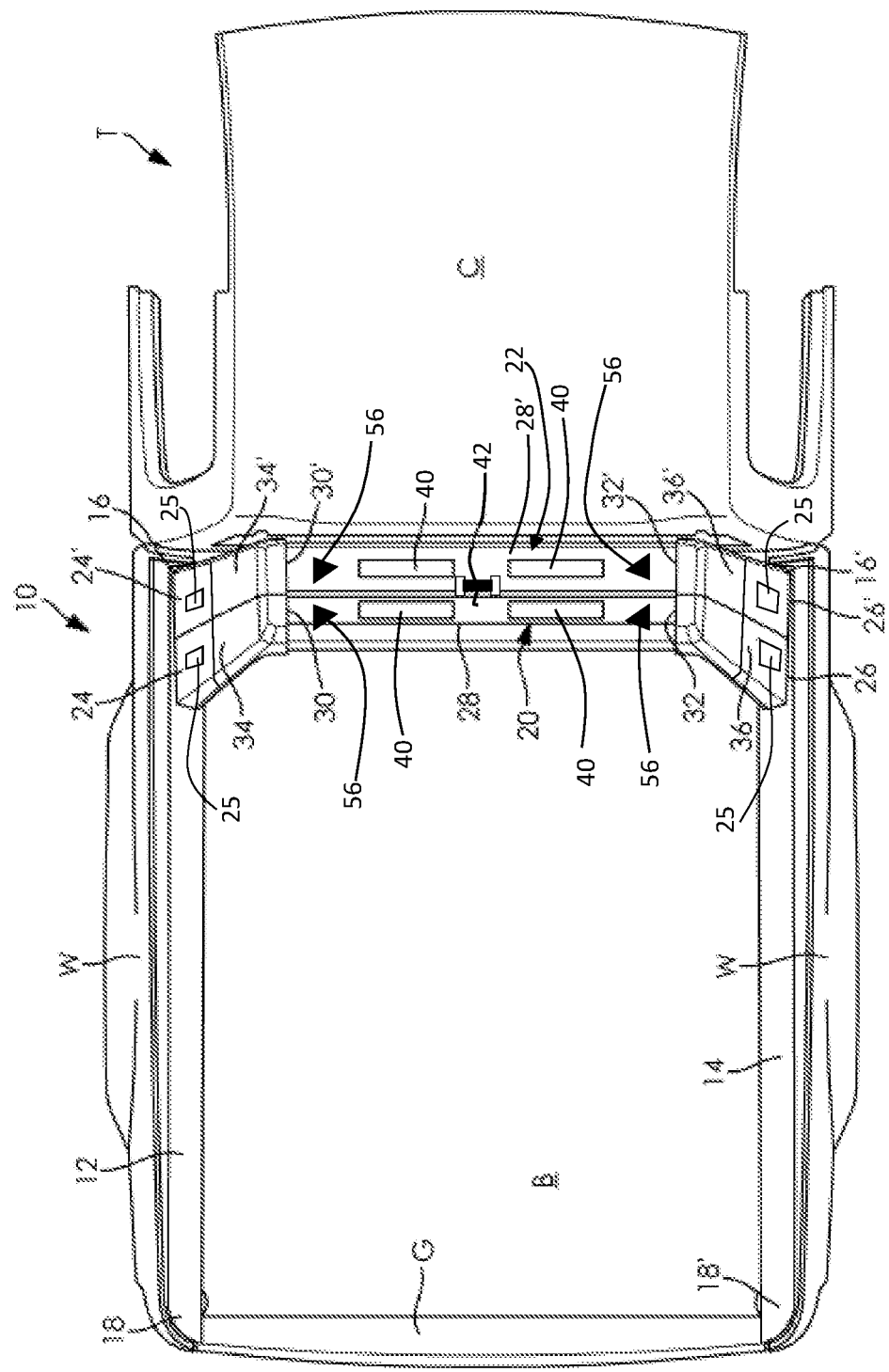
FIG. 7 is a top view of a cargo rack according to embodiments mounted on a pickup truck in a closed or unloaded configuration.
Figure 8:
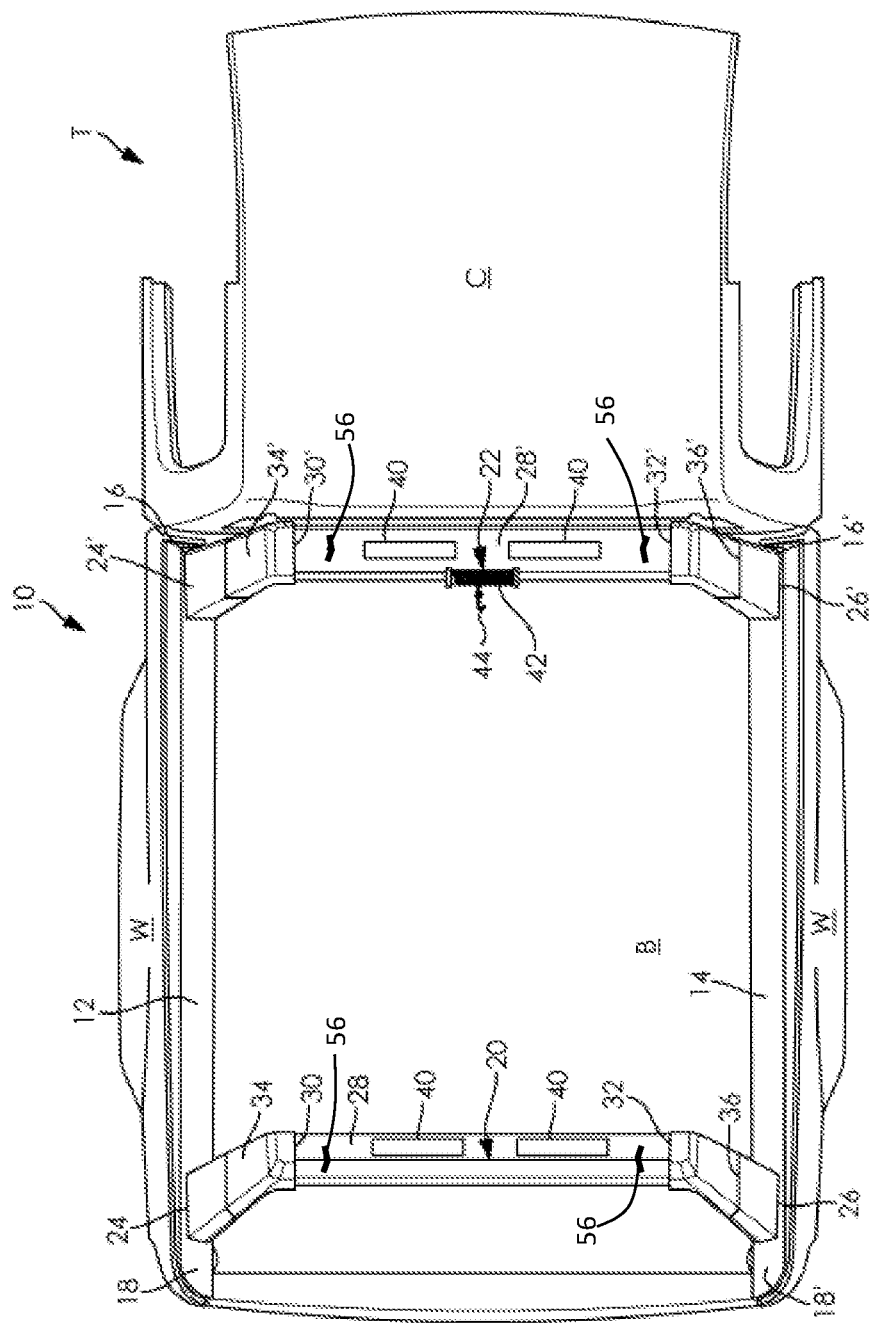
FIG. 8 is a top view of the cargo rack of FIG. 7 in an open or loaded configuration.

As shown in the embodiments of FIGS. 7 and 8, the second support structure 22 is equipped with a winch 42, for example fixed to the cross member 28'. The winch includes a winch strap 44 that can be extended from the cross member 28' of the second support structure 22 toward the liftgate or tailgate G of the truck T. The winch strap 44 can then be secured to the cargo to be loaded. The winch strap can then be retracted by the winch, thereby pulling the cargo toward the second support structure 22 and the cab C of the truck T.

According to embodiments, each of the support structures 20, 22 includes at least one tie down strap 46 or bungie cord connected thereto at a first end of each tie down strap or bungie cord. As shown in FIGS. 1-4, the tie down straps or bungie cords 46 can be provided on retractable coils on the inside surface of any of the support members 34, 34', 36, 36'. The tie down straps or bungie cords are extendable from each of the support structures 20, 22 and are configured to securely tie cargo to the support structures 20, 22 of the rack. This feature ensures that a user always has the equipment necessary to securely tie cargo to the rack, thereby eliminating the need to find the necessary equipment of plan ahead before use. The embodiments of FIGS. 5-8 may also include a tie down strap 46 or bungie cord, however, these features are not visible in the perspective of FIGS. 5-8.

As shown in FIGS. 1-4 in embodiments, one or both of the support structures 20, 22 include a plurality of tie down points 38 that can be used to tie, hook, or otherwise secure tie down straps or bungie cords to. According to embodiments, the tie down points 38 are defined in the support members 34, 34', 36, 36' of the support structures 20, 22. The embodiments of FIGS. 5-8 may also include a tie down points 38, however, these features are not visible in the perspective of FIGS. 5-8.

Figure 2:
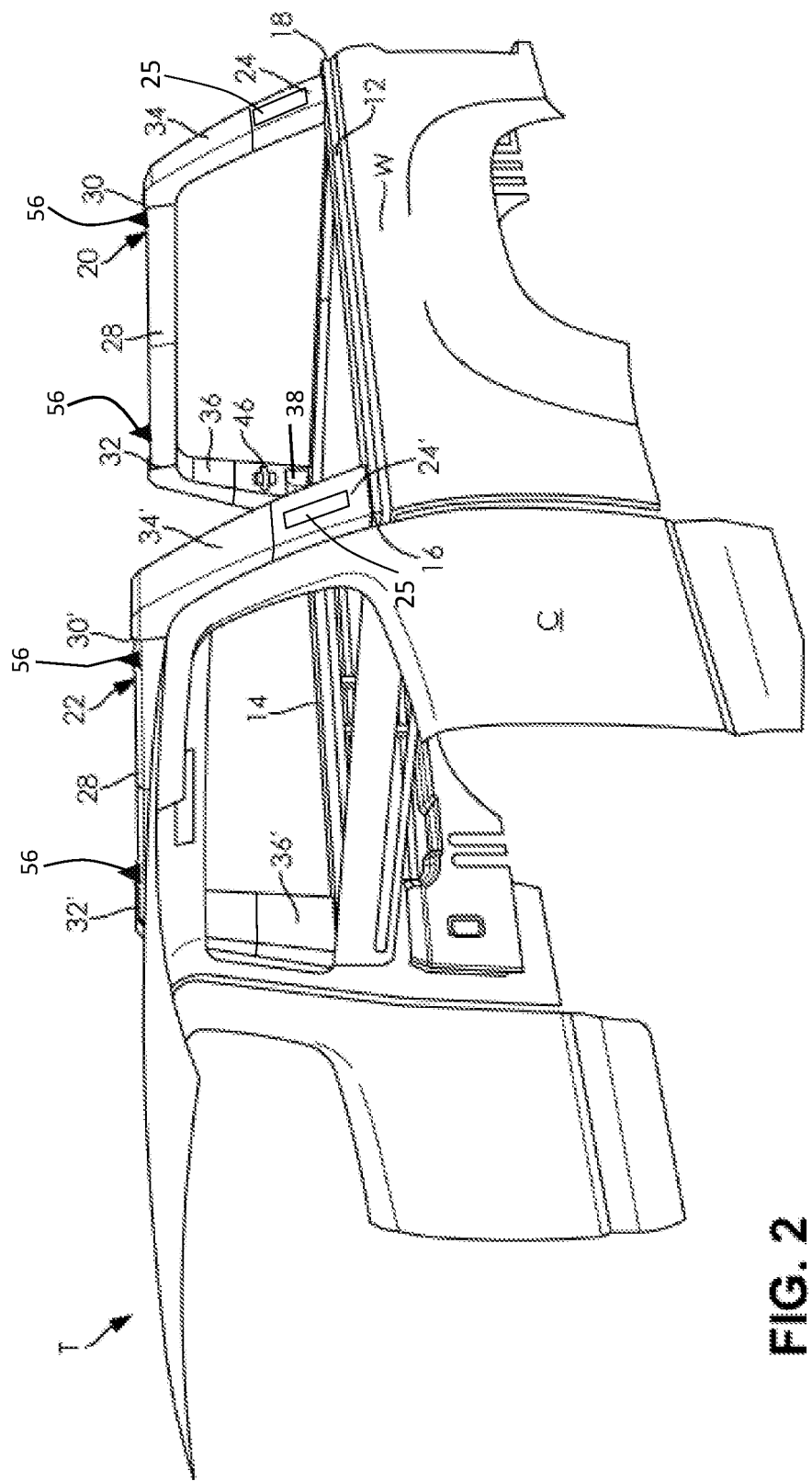
FIG. 2 is a front perspective view of the cargo rack of FIG. 1 in an open or loaded configuration.

As shown in the embodiments of FIGS. 1, 2, 7, and 8, the rack 10 includes a plurality of slide stops 56. The slide stops 56 are positioned on the upper surface of the cross members 28, 28' and are configured to extend therefrom. As shown in FIGS. 1 and 7, when the support structures 20, 22 are in a closed or unloaded position near the first ends 16, 16' of the rails 12, 14, the slide stops are configured to be folded down and flush with the upper surface of the cross members 28, 28. As shown in FIGS. 2 and 8, when the support structures 20, 22 are in a loaded position in which the first support structure 20 is positioned near the second end 18, 18' of the rails 12, 14 and the second support structure 22 is positioned near the first end 16, 16' of the rails 12, 14, the slide stops 56 are configured to be flipped upward to extend from the cross members 28, 28. The slide stops 56 are useful for preventing cargo from sliding off the ends of the support structures 20, 22. The embodiments of FIGS. 3-6 may also include slide stops, however, these features are not visible in the perspective of FIGS. 3-6 or not is use in those figures.

Given the features of the inventive rack, the rack 10 is suitable for permanent installation on a truck. That is, because the rails 12, 14 can be mounted to the walls W of the truck T, the rack 10 does not take up valuable cargo space within the bed B of the truck. Additionally, because the support structures 20, 22 are slidable within the rails 12, 14, the support structures can be positioned near the first ends 16, 16' of the rails 12, 14 directly behind the cab C of the truck T, which during non-use of the rack can act as an air foil on the back of the cab C of the truck to decrease drag and improve aerodynamics of the truck without impairing the rear view of the driver. Furthermore, the features of the inventive rack enable easy and safe loading and unloading of cargo from the rack 10 by a single user.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A rack for a truck comprising:
a rail system comprising a first rail and a second rail, each rail having a first end and a second end, the second rail configured to be spaced apart from and positioned parallel to the first rail; and
a first support structure and a second support structure each having a first end and a second end and comprising a cross member having a first end and a second end and an upper support surface configured to be parallel with a horizontal surface of a bed of a truck, each cross member configured to laterally extend between said first rail and said second rail, wherein said first support structure and said second support structure are configured to engage with an upper surface of said rail system and wherein at least said first support structure is configured to be slidably positioned within said rail system such that said first support structure abuts said second support structure with the cross member of said first support structure being substantially orthogonal to said first support structure and in abutting contact with the cross member of said second support structure in an unloaded configuration and said first support structure is separated from said second support structure in a loaded configuration.

2. The rack of claim 1 wherein the first end of said first support structure and the first end of the second support structure are configured to be positioned in the first rail and wherein the second end of the first support structure the second end of the second support structure are configured to be positioned in the second rail.

3. The rack of claim 1 wherein said second support structure is configured to be slidably positioned within said rail system.

4. The rack of claim 1 wherein each of said support structures further comprises a first support member extending from the first end of each cross member to the first end of each support structure and a second support member extending from the second end of each cross member to the second end of each support structure.

5. The rack of claim 4 wherein the support members of at least said first support structure are configured to be height adjustable.

6. The rack of claim 1 wherein each of said first support structure and said second support structure are C-shaped.

7. The rack of claim 1 wherein the cross member of each of said support structures includes a roller.

8. The rack of claim 1 wherein each of said support structures define a plurality of tie down points.

9. The rack of claim 1 further comprising a winch fixed to the cross member of said second support structure.

10. The rack of claim 1 further comprising at least one tie down strap or bungie cord connected at a first end to each of said support structures, the at least one tie down strap or bungie cord extendable from each of said support structures.

11. The rack of claim 1 wherein the cross member of each of said support structures includes a plurality of slide stops.

12. The rack of claim 1 wherein the first rail and the second rail are configured to be attached to opposite sides of a bed of a truck.

13. The rack of claim 1 wherein the first rail and the second rail are configured to be attached to opposite walls that border a bed of a truck.

14. The rack of claim 1 wherein said a first rail and said second rail are formed of aluminum.

15. The rack of claim 1 wherein said first and second support structures are formed of an aluminum, a thermoset, a thermoplastic, or a combination thereof.

16. A rack for a truck comprising:
a rail system comprising a first rail and a second rail, each rail having a first end and a second end, the second rail configured to be spaced apart from and positioned parallel to the first rail; and
a first support structure and a second support structure each having a first end and a second end and comprising a cross member having a first end and a second end, each cross member configured to laterally extend between said first rail and said second rail, wherein said first support structure and said second support structure are configured to engage with said rail system and wherein at least said first support structure is configured to be slidably positioned within said rail system such that said first support structure abuts said second support structure with the cross member of said first support structure in abutting contact with the cross member of said second support structure in an unloaded configuration and said first support structure is separated from said second support structure in a loaded configuration;

wherein said first support structure is configured to be slidably positioned by electronic controls.

17. The rack of claim 16 wherein the electronic controls are controlled by a user remote.

18. A rack for a truck comprising:
a rail system comprising a first rail and a second rail, each rail having a first end and a second end, the second rail configured to be spaced apart from and positioned parallel to the first rail; and
a first support structure and a second support structure each having a first end and a second end and comprising a cross member having a first end and a second end, each cross member configured to laterally extend between said first rail and said second rail, wherein said first support structure and said second support structure are configured to engage with said rail system and wherein at least said first support structure is configured to be slidably positioned within said rail system such that said first support structure abuts said second support structure with the cross member of said first support structure in abutting contact with the cross member of said second support structure in an unloaded configuration and said first support structure is separated from said second support structure in a loaded configuration;

wherein said second support structure is configured to be slidably positioned by electronic controls as to at least one of vertical height or along the first rail and the second rail.

19. The rack of claim 18 wherein the electronic controls are controlled by a user remote.

* * * * *